(12) United States Patent
Bhangley et al.

(10) Patent No.: US 7,995,491 B1
(45) Date of Patent: Aug. 9, 2011

(54) MPLS VPN CONNECTIVITY ALARM STORM REDUCTION

(75) Inventors: Rohini Bhangley, Marlboro, NJ (US); Li-Jin Chung, Lincroft, NJ (US); Kevin D'Souza, Cranbury, NJ (US); Madhukar Kshirsagar, Morganville, NJ (US); Leah Zhang, Holmdel, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1303 days.

(21) Appl. No.: 11/406,968

(22) Filed: Apr. 19, 2006

(51) Int. Cl.
*H04L 12/00* (2006.01)
(52) U.S. Cl. ........................ 370/252; 370/216
(58) Field of Classification Search .................. 370/252, 370/253, 216–228, 242, 245, 244, 243; 709/223–226
See application file for complete search history.

(56) References Cited

U.S. PATENT DOCUMENTS

| | | | |
|---|---|---|---|
| 6,477,166 B1 | 11/2002 | Sanzi et al. | |
| 6,915,445 B2* | 7/2005 | Navar et al. | 714/4 |
| 6,956,822 B2* | 10/2005 | Hujber | 370/238 |
| 2003/0079043 A1* | 4/2003 | Chang et al. | 709/249 |
| 2004/0151181 A1 | 8/2004 | Chu et al. | |
| 2006/0002409 A1* | 1/2006 | Menon et al. | 370/409 |
| 2007/0097867 A1* | 5/2007 | Kneckt et al. | 370/236 |
| 2007/0226325 A1* | 9/2007 | Bawa et al. | 709/223 |

* cited by examiner

*Primary Examiner* — Ricky Ngo
*Assistant Examiner* — Gary Mui
(74) *Attorney, Agent, or Firm* — Hoffman & Baron, LLP

(57) ABSTRACT

Techniques for monitoring and processing network reachability events across a service provider's network are disclosed. The techniques include monitoring provider-edge routers by identifying reachability events and partial packet loss events, and processing those events so as to reduce the number of alarms generated for investigation.

12 Claims, 4 Drawing Sheets

MPLS VPN CONNECTIVITY ALARM STORM REDUCTION

TECHNICAL FIELD

The present invention generally relates to network monitoring, and more particularly to a method and device for detecting and correlating failures in a MPLS-VPN (Multiprotocol Label Switching Virtual Private Network) network.

BACKGROUND OF THE INVENTION

Virtual Private Networks ('VPNs') are secured private network connections that are built on top of publicly-accessible infrastructure, such as the Internet or the public telephone network. VPNs typically employ a combination of data routers, switches and access controls that allow various types of data to be transmitted between computers.

Typically, VPNs are configured to connect to a service provider's backbone network. Today, service provider networks tend to be Internet protocol ('IP') based and are configured to use Multiprotocol Label Switching ('MPLS'). MPLS is a vendor-independent protocol that applies labels to data packets that are transmitted across a service provider's backbone network.

Effective operation of the network requires that two service Provider Routers ('P-Routers') agree on the meaning of labels used to forward traffic between and through them. This common understanding is achieved by a set of procedures, an example being Label Distribution Protocol ('LDP'), by which one P-Router informs the other of the label bindings it has made. Various MPLS enabled protocols may be used by P-Routers to establish Label Switched Paths ('LSPs') through the network by mapping the network-layer routing information directly to the data-link layer switched paths.

Use of VPNs can reduce an organization's networking complexity and costs. For example, rather than setting up and managing individual point-to-point circuits between offices using leased lines, VPN implementations only need to establish one connection from each offices' router (e.g., a Customer Edge Router ('CE-Router')) to a service Provider Edge Router ('PE-Router'). Typically, the PE-Router is linked directly to the service provider's backbone network.

Network monitoring and alarming is critical to understanding the impact of a network fault in the service provider's network. For example, a single network fault in a service provider's backbone network can result in an array of symptoms that impact several VPNs. Associating these symptoms to their original cause can be difficult. A multitude of alarms/traps also may be generated by these symptoms that can cumulatively overwhelm support organizations charged with determining the original cause of network failures. As a result, improved monitoring and alarming techniques to determine the cause of network failures are needed.

SUMMARY OF THE INVENTION

Techniques for monitoring and processing network reachability events across a service provider's network are disclosed. The techniques include monitoring provider-edge routers by identifying reachability events and partial packet loss events, and processing those events so as to reduce the number of alarms generated for investigation.

Various aspects of the system relate to identifying network reachabilty events and processing the events to reduce the number of alarms that need to be investigated.

For example, according to one aspect, a method includes determining a network impairment between at least two provider-edge routers and generating an event notification based on the network impairment. The event notification identifies the at least two provider-edge routers and the network impairment. The method also includes generating an alarm based on a plurality of event notifications.

In some embodiments, the method also may include determining the network impairment by forwarding a data packet between two provider-edge routers and sending a remote command to at least one of the provider-edge routers to forward the data packet at a set time interval.

In some embodiments, the method includes generating the alarm by identifying a first provider-edge router associated with a greatest frequency of event notifications, and converting the event notifications associated with the first provider-edge router into a provider-node based alarm.

In other embodiments, the method includes generating a single path-based alarm in response to the greatest frequency of event notifications associated with the first provider-edge router being less than two.

The method also may include calculating a total number of router failures from a plurality of provider-node based alarms, comparing the total number of router failures to a total number of provider edge routers multiplied by a percentage of provider-edge routers capable of having a failure, and generating a provider-edge node alarm based on the comparison.

In yet other embodiments, the method includes calculating a minimum number of event notifications representing a provider node failure, and comparing a total number of events associated with each of the plurality of provider-edge nodes to the minimum number of event notifications. In these embodiments, the method also may include generating a provider-edge node alarm based on the comparison and converting a plurality of provider-edge node alarms into a single provider-node based alarm.

The method also may include generating the single provider-node based alarms in response to comparing an elapsed time between a plurality of event notifications and a threshold value representing a network convergent time.

A system, as well as articles that include a machine-readable medium storing machine-readable instructions for implementing the various techniques, are disclosed. Details of various embodiments are discussed in greater detail below.

BRIEF DESCRIPTION OF THE DRAWINGS

Like reference symbols in the various drawings indicate like elements.

DETAILED DESCRIPTION OF THE PREFERRED EMBODIMENTS

Figure 1:
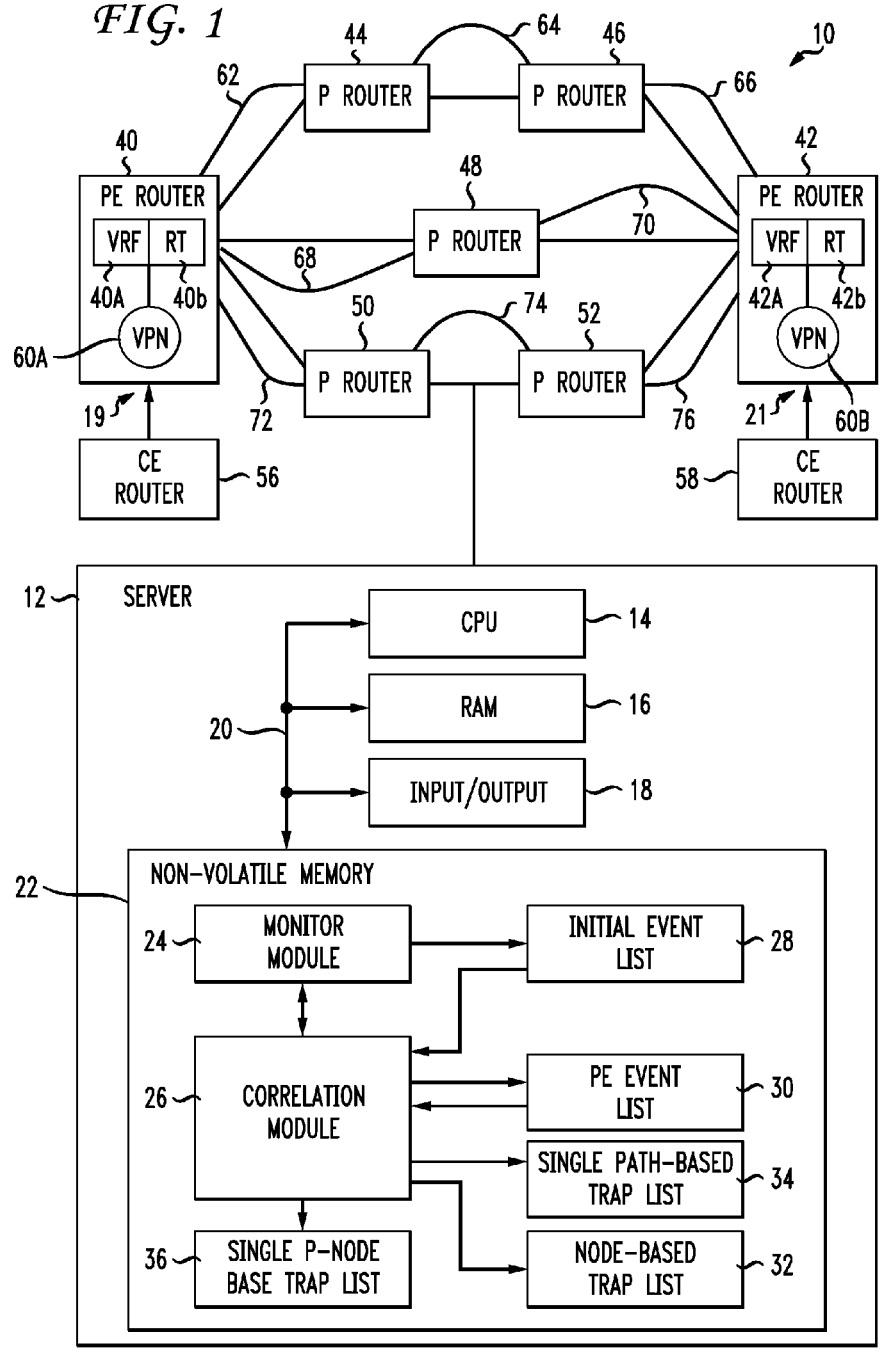
FIG. 1 illustrates a block diagram of an exemplary Label Distribution Protocol network.

Referring now to FIG. 1, a block diagram of a system for detecting and correlating network failures in a MPLS-VPN network 10 is disclosed. In one preferred embodiment, as shown in FIG. 1, the network 10 is configured to provide Virtual Private Network ('VPN') connection services using Multiprotocol Label Switching ('MPLS') and may include physical network components, e.g., nodes, routers, computer systems, disk drives, etc., and logical network components, e.g., software, application software, ports, etc. It will be appreciated by one skilled in the art that the present invention is not limited to a MPLS-VPN network and other network communication configurations may benefit from the present invention.

In one preferred embodiment, as shown in FIG. 1, the network 10 includes Provider Edge ('PE') routers 40, 42 that are configured to allow a VPN identifying label to be set. As shown in FIG. 1, the PE routers 40, 42 are network units located at an ingress 19 and egress 21 location of the network 10 and facilitate construction of a VPN 60A, 60B. Although only one VPN 60A, 60B is illustrated in FIG. 1, the present invention is not limited to one VPN and may be deployed in a networking environment supporting multiple VPNs.

Customer Edge ('CE') routers 56, 58 are provided that connect the VPN 60A, 60B to the network 10. In one preferred embodiment, for example, the CE routers 56, 58 provide the PE routers 40, 42 with route information for establishing the VPN 60, 62.

As shown in FIG. 1, Provider Routers ('P-Routers') 44, 46, 48, 50 and 52 are provided in the network 10 and are used to forward traffic to and from the VPN 60A, 60B. In one preferred embodiment, the P-Routers 44, 46, 48, 50 and 52 and PE routers 40, 42 transmit information over the network 10 using a MPLS enabled protocol. For example, in one preferred embodiment, the Label Distribution Protocol ('LDP') is employed by the P-Routers 44, 46, 48, 50 and 52 to establish Label Switched Paths ('LSPs') 62, 64, 66, 68, 70, 72, 74, and 76 through the network 10 by mapping network-layer routing information directly to the data-link layer switched paths. Of course, as will be appreciated by one skilled in the art, the present invention is not limited to LDP embodiments and other MPLS-enabled protocols may be used with the present invention.

As shown in FIG. 1, in one preferred embodiment, the PE routers 40, 42 may each be configured to include a Virtual Routing and Forwarding ('VRF') module 40a and 42a, respectively, and a Routing Table ('RT') 40b and 42b, respectively, that transfer packets to a particular VPN. In one preferred embodiment, each RT 40b and 42b is assigned to a particular VPN. The VRF modules 40a and 42a use the RTs 40b and 42b to determine a next hop in the network 10 for a MPLS label reference.

For example, in one preferred embodiment, given a packet of information sent from one part of the VPN 60A to the network 10, the source PE-router 40 determines a destination for the packet in accordance with the RT 40b accessible to the VRF module 40a. The PE-router 40 then encapsulates the packet in a messaging format in accordance with a destination. In one preferred embodiment, the messaging format includes data, an Internet Protocol header and a set of MPLS labels, each label representing either an identifying label for a second part of the VPN 60b or a label for transfer along the LSPs meant for the destination PE-router 42.

Once the packet is encapsulated by the source PE-router 40, the packet is transferred to one of the P-Routers 44, 48, 50 over one of the LSPs 62, 68, 72 using the VRF module 40a and RT 40b of the source PE-router 40. The receiving P-Router, for example, P-Router 50, executes label switching on the basis of one or more MPLS labels included in the packet. In one preferred embodiment, the P-Router 50 replaces a first MPLS label with a second MPLS label and transfers the resulting packet to another P-Router 52. This second P-Router 52 then may transmit the resulting packet to the destination PE-router 42 over another LSP 76. The destination PE-router 42 removes the MPLS labels from the packet and using the VRF module 42a and RT 42b of the destination PE-router 42, delivers the packet to the VPN site 60B. In this manner, the network 10 implements a MPLS-VPN service.

In particular, the P-Routers 44, 46, 48, 50 and 52 map the incoming label and incoming port information into an outgoing label and outgoing port. In some preferred embodiments, the incoming port is the identifier of the network interface at which a packet arrives and the outgoing port is the identifier of the network interface through which the packet will be transmitted. In one preferred embodiment, the P-Routers 44, 46, 48, 50 and 52 base their forwarding decisions on the MPLS label and incoming port combination. In some preferred embodiments, for example, the core MPLS nodes 44, 46, 48, 50 and 52 may replace the MPLS label in the incoming packet with a new MPLS label in the outgoing packet and transmit the new packet via the outgoing port.

As shown in FIG. 1, a server 12 is provided that is coupled to the network 10. The server 12 includes a central processing unit ('CPU') 14, random access memory ('RAM') 16, non-volatile memory 22 and an input-output device 18, all of which are preferably interconnected via a common bus 20 and controlled by the CPU 14. The non-volatile memory 22 is configured to include a monitor module 24 and a correlation module 26 for monitoring the network 10.

The monitor module 24 proactively identifies reachability failures between PE-routers 40, 42 and any potential data loss (e.g., partial or total data loss) that may occur between PE routers 40, 42. In one preferred embodiment, the monitor module 24 may query the PE-routers 40, 42 for connectivity at preset intervals of time (i.e., every seven (7) minutes). In these embodiments, the monitor module 24 executes a router command utility, such as a 'Ping' command, to forward data packets from particular PE-Routers to other PE-Routers to determine the quality of a particular LSP and/or verify the connection of a particular P-Router to the network 10. In some preferred embodiments, the monitor module 24 transmits an ICMP 'echo packet' (i.e. an extension to the Internet Protocol that allows for the generation of error messages, test packets and informational messages related to IP) to test the connectivity between PE-Routers 40, 42. In these embodiments, the source address of the ping command may be the IP address of the interface that the packet uses to exit the particular PE router. If the ping command succeeds, it is an indication that there is no routing problem. In these embodiments, results of the transmission include an ICMP 'echo reply' packet that indicate receipt of the echo packet by a particular P-Router. In some preferred embodiments, the results also may include the amount of time from when the packet was sent from the monitor module 24 to the particular PE-Router to receipt of the echo packet by the server 12. If the ping command fails, the monitor module 24 generates an alarm (e.g., a trap) for the failure and/or impairment and stores the event time and PE-Router pair (e.g., source PE-Router and destination PE-Router) in an initial event list 28.

The initial event list 28 provides access and storage to connectivity failures and/or impairments identified by the monitor module 24. In one embodiment, the initial event list 28 is a relational database that accesses and stores event time and PE-Router pairs relating to connectivity failures and/or impairments. In other embodiments, the initial event list 28 may be a directory server, such as a Lightweight Directory Access Protocol (LDAP) server, that accesses account identifier information. In other embodiments, the initial event list 28 may be a configured area in the non-volatile memory 22 of the server 12 to access and store network failure/impairment information.

The correlation module 26 correlates multiple failures and/or impairments identified by the monitor module 24 into a single possible cause for further investigation by support organizations. As a result, the correlation module 26 reduces the number of alarms that need to be investigated.

Figure 2:
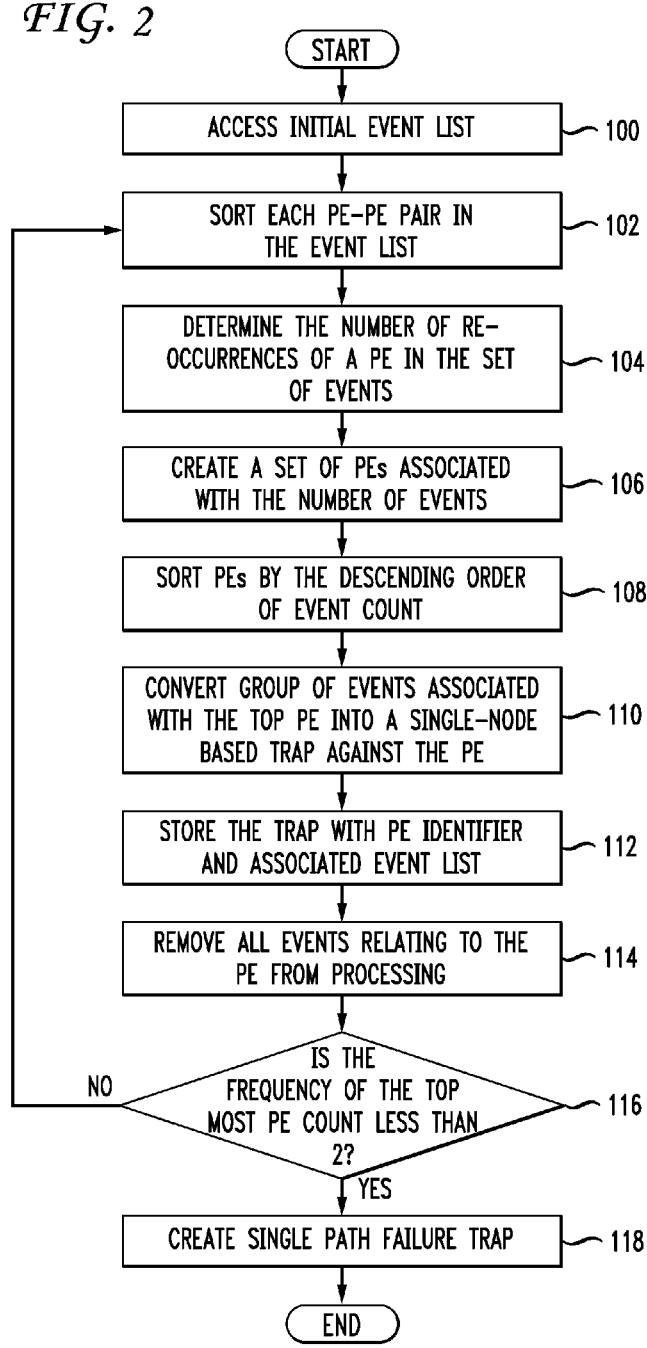
FIG. 2 is a flow chart of a method for isolating single path and provider edge router failures.

For example, referring now to FIG. 2, in one preferred embodiment, the correlation module 26 executes the following method to isolate single path and PE-Router failures. First, the correlation module 26 accesses 100 the initial event list 28 generated by the monitor module 24. Next, the correlation module 26 sorts each PE-PE router pair in the event list 28 lexically 102. For example, assuming four PE-router identifier pairs such as 'A1-D1', 'A1-C1', 'C1-D1' and 'B1-C1' in the initial event list 28, the correlation module 26 sorts the pairs lexically into 'A1-C1', 'A1-D1', 'B1-C1' and 'C1-D1'. Next, the correlation module 26 determines the number of times each PE-Router is associated with an event in the list 104. For example, using the above example, the PE-Router 'C1' occurs three (3) times, the PE-Router 'A1' occurs two (2) times and the PE-Routers 'B1' and 'D1' occur one (1) time. Next, the correlation module 28 creates a Per PE-Event list 30 that stores for each PE-Router, a PE-Router node identifier, the total number of events associated with the PE-Router node, and each event time and PE-PE pair associated with each event 106. Similar to the initial event list 28, the Per PE event list 30 may be implemented as a relational database, LDAP directory or be a configured area in the non-volatile memory 22 of the server 12.

Next, the correlation module 26 sorts the PE-Router node identifiers in the Per-PE event list 30 by descending order of event account 108. For example, a PE node identifier having the largest number of total events associated with it becomes the Top PE node identifier in the Per-PE event list 30. Next, the correlation module 26 converts a group of events associated with the Top PE into a single node based trap against the PE Router 110. In some preferred embodiments, as shown in FIGS. 1 and 2, the correlation module 26 stores the trap (e.g., alarm) with the PE node identifier and associated event list 110 into a node-based trap list 32 (e.g., a list containing multiple events associated with a particular PE router) 112. Similar to the Per-PE event list 30, the node-based trap list 32 may be implemented as a relational database, LDAP directory or be a configured area in the non-volatile memory 22 of the server 12 and include a PE-Router node identifier, the total number of events associated with the PE-Router node, and each event time and PE-PE pair associated with each event.

Once the correlation module 26 generates the node-based trap list 32, the correlation module 26 removes all events relating to the PE router from processing 114. For example, in one preferred embodiment, entries in the initial event list 28 and Per PE event list 30 relating to the PE router are deleted from the same. Next, the correlation module 26 determines whether the total number of events associated with the top most PE router is less than two (2) 116. If the total number of events associated with the top most PE router is less than two (2), the correlation module creates a single path failure trap 118 and stores the same in a single path-based trap list 34. Similar to the node-based trap list 32, the single path-based trap list 34 may be implemented as a relational database, LDAP directory or be a configured area in the non-volatile memory 22 of the server 12 and include a PE-Router node identifier and each event time and PE-PE pair associated with each event.

Figure 3:
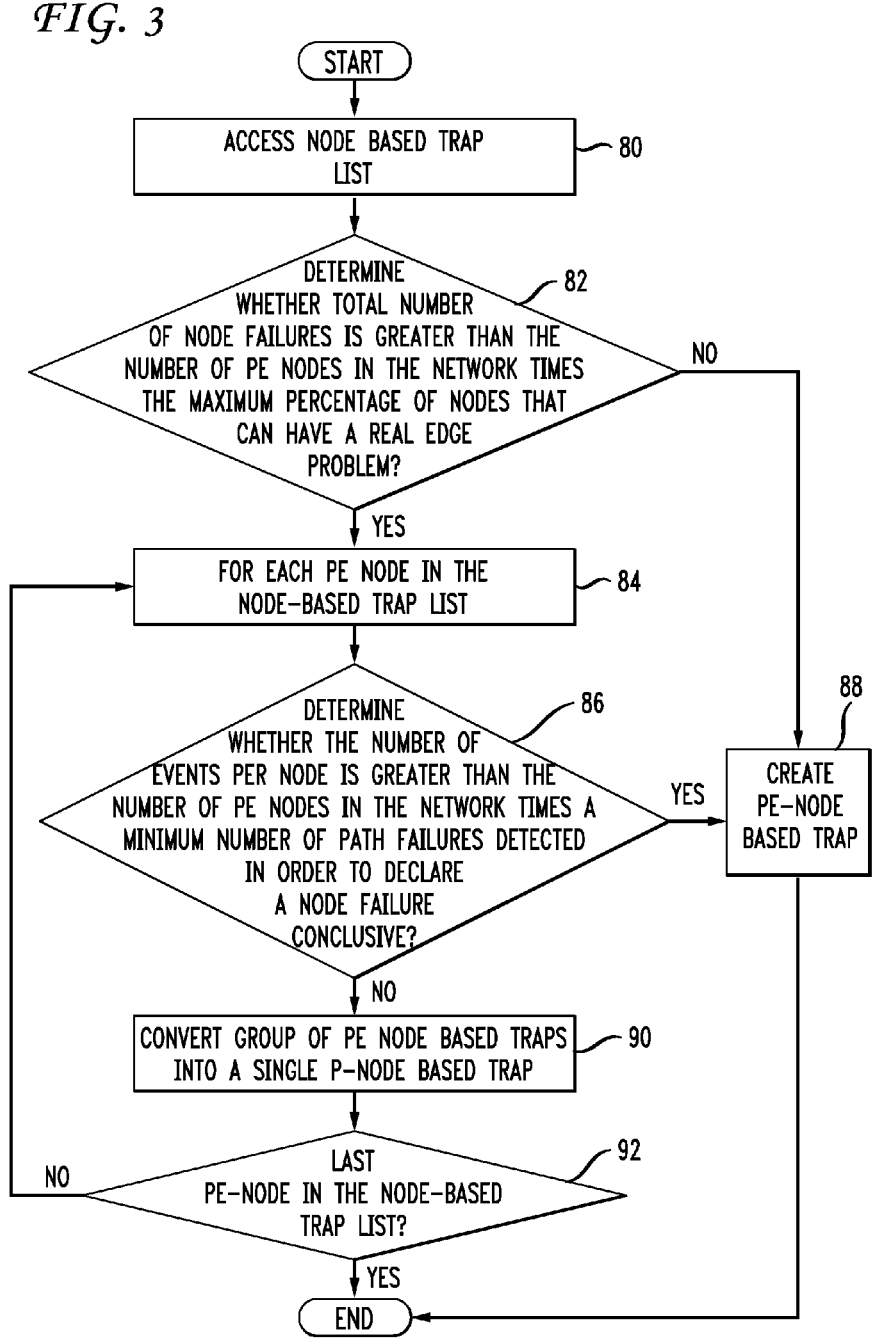
FIG. 3 is a flow chart of a method for isolating provider router failures.

Referring now to FIG. 3, in one preferred embodiment, the correlation module 26 may execute the following method to isolate P-Router failures that have affected PE router connectivity. First, as shown in FIGS. 1 and 3, the correlation module 26 accesses 80 the node-nased trap list 32. Next, the correlation module 26 determines whether the total number of nodes in the node-based trap list 32 is greater than the number of PE nodes in the network multiplied by the maximum percentage of nodes that can have a real provider edge problem 82. In one preferred embodiment, the percentage of nodes that can have a real provider edge problem is defaulted to five (5) percent. In other embodiments, other percentages are established. If the number calculated is not greater, the correlation module 26 generates a PE-node based trap 88 and stores the same in the node-based trap list 32. Otherwise, for each PE-node 84 in the node-based trap list 32, the correlation module 26 determines whether the number of events per node is greater than the number of PE nodes in the network multiplied by a minimum number of path failures detected in order to declare a node failure conclusive 86. If the number of events per node is greater, the correlation module 28 generates a PE-node based trap 88 and stores the same in the node-based trap list 32. Otherwise, the correlation module 26 converts a group of PE-node based traps into a single P-Node (e.g., P-Router) based trap and stores the same in a single P-Node based trap event list 36. Lastly, the correlation module 28 determines whether the last PE-node in the node-based trap list was processed 92.

Figure 4:
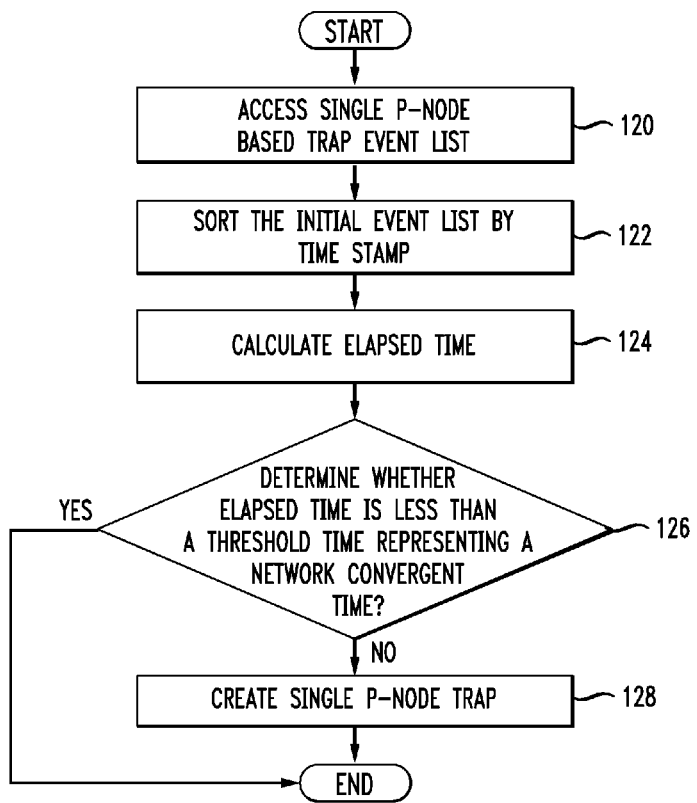
FIG. 4 is a flow chart of a method for isolating temporal provider router failures.

The correlation module 26 also may identify temporal (e.g., of time) P-Router (e.g., backbone) events that affected PE router connectivity. For example, referring now to FIG. 4, a method executed by the correlation module 26 to isolate P-Router failures is disclosed. In one preferred embodiment, as shown in FIG. 4, the correlation module 26 first accesses the single P-Node based traps 120 stored in the single P-Node based event list 36. Next, the correlation module 26 accesses the initial event list 28 and sorts the list 28 using each event's time stamp 122. Once the initial event list 28 is sorted, the correlation module 26 calculates an elapsed time by subtracting the first time stamp for an event from the last time stamp for an event 124. Next, the correlation module 26 compares the calculated elapsed time to a threshold time value representing a network convergent time 126. If the calculated elapsed time is not less than the threshold value, the correlation module 26 generates a single P-Node based trap 128 and stores the same in the single P-Node based trap event list 36.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

A number of embodiments of the invention have been described. Nevertheless, it will be understood that various modifications may be made without departing from the spirit and scope of the invention. For example, the modules described above may be organized or contained in various ways, and may reside on multiple computers. Also, the steps described above may be modified in various ways or performed in a different order than described above, where appropriate. Accordingly, other embodiments are within the scope of the following claims.

What is claimed is:

1. A method of managing network impairments comprising:
   collecting a plurality of network events associated with at least two provider-edge routers, the network events indicating at least a partial data loss;
   determining a characteristic of the network events associated with each of the at least two provider-edge routers, the characteristic comprises a quantity of network events associated with each of the at least two provider-edge routers;
   comparing the characteristic to a first threshold value;
   generating an alarm based on the comparison of the characteristic to the first threshold value, wherein generating the alarm comprises generating a node-based provider-edge alarm in response to the quantity of network events being greater than one;
   comparing a total number of events associated with each of a plurality of node-based provider-edge alarms to a second threshold value; and
   generating a single provider-node alarm from the plurality of node-based provider-edge alarms based on the comparison of the total number of events associated with each of the provider-edge alarms to the second threshold value.

2. The method of claim 1, wherein generating the alarm comprises generating a single path-based alarm in response to the quantity of network events being one.

3. The method of claim 1, further comprising comparing a total number of provider-edge alarms to a quantity of provider-edge routers expected to fail.

4. The method of claim 1, further comprising:
   comparing an elapsed time between at least two network events to a third threshold value; and
   generating a single provider-node alarm based on the comparison of the elapsed time to the third threshold value.

5. The method of claim 1, wherein collecting the plurality of network events comprises forwarding a data packet between the at least two provider-edge routers.

6. The method of claim 5, further comprising sending a remote command to at least one of the provider-edge routers to forward the data packet during a pre-determined time interval.

7. A system comprising:
   a network having at least two provider-edge routers;
   a service delivery device coupled to the network, the service delivery device including a processor and memory storing instructions that, in response to receiving a request for access to a service, cause the processor to:
   collect a plurality of network events associated with the at least two provider-edge routers, the network events indicating at least a partial data loss;
   determine a quantity of network events associated with each of the at least two provider-edge routers;
   determine a characteristic of the network events associated with each of the at least two provider-edge routers;
   compare the characteristic to a first threshold value;
   generate an alarm based on the comparison of the characteristic to the first threshold value; and
   generate a node-based provider-edge alarm in response to the quantity of network events being greater than one;
   compare a total number of events associated with each of a plurality of node-based provider-edge alarms to a second threshold value; and
   generate a single provider-node alarm from the plurality of node-based provider-edge alarms based on the comparison of the total number of events associated with each of the provider-edge alarms to the second threshold value.

8. The system of claim 7, wherein the memory stores instructions that, in response to receiving the request over the network, cause the processor to generate a single path-based alarm in response to the quantity of network events being one.

9. The system of claim 7, wherein the memory stores instructions that, in response to receiving the request over the network, cause the processor to compare a total number of provider-edge alarms to a quantity of provider-edge routers expected to fail.

10. The system of claim 7, wherein the memory stores instructions that, in response to receiving the request over the network, cause the processor to:
    compare an elapsed time between at least two network events to a third threshold value; and
    generate a single provider-node alarm based on the comparison of the elapsed time to the third threshold value.

11. The system of claim 7, wherein the memory stores instructions that, in response to receiving the request over the network, cause the processor to forward a data packet between the at least two provider-edge routers.

12. The system of claim 11, wherein the memory stores instructions that, in response to receiving the request over the network, cause the processor to send a remote command to at least one of the provider-edge routers to forward the data packet during a pre-determined time interval.

* * * * *